United States Patent
Salisbury et al.

[19]

[11] Patent Number: 6,041,703
[45] Date of Patent: Mar. 28, 2000

[54] COMPACT DISC PRINTING SYSTEM AND METHOD

[75] Inventors: Phillip C. Salisbury, Golden Valley; David J. Rother, Hastings; Roger E. Haro, Eden Prairie; John S. Lee, Coon Rapids; Donald Hollerich, Edina, all of Minn.

[73] Assignee: Rimage Corporation, Edina, Minn.

[21] Appl. No.: 08/944,315

[22] Filed: Oct. 6, 1997

Related U.S. Application Data

[63] Continuation-in-part of application No. 08/579,927, Dec. 28, 1995, Pat. No. 5,734,629.

[51] Int. Cl.$^7$ .................................................. B41F 17/36
[52] U.S. Cl. .................................................. 101/37; 101/38.1
[58] Field of Search .................................. 101/35–36, 37, 101/38.1, 39, 40, 40.1, 41, 42, 43, 44

[56] References Cited

U.S. PATENT DOCUMENTS

| | | | |
|---|---|---|---|
| 3,673,954 | 7/1972 | Lala | 101/40 |
| 5,504,688 | 4/1996 | Letourneau | 101/4 |
| 5,518,325 | 5/1996 | Kahle | 400/70 |
| 5,562,030 | 10/1996 | Karlyn et al. | 101/127.1 |
| 5,669,303 | 9/1997 | Maracas et al. | 101/327 |
| 5,882,555 | 3/1999 | Rohde et al. | 264/1.33 |

FOREIGN PATENT DOCUMENTS

| | | |
|---|---|---|
| 0528106 | 8/1991 | European Pat. Off. . |
| 2217107 | 10/1989 | United Kingdom . |
| WO95/07531 | 4/1995 | WIPO . |

OTHER PUBLICATIONS

"Kodak Disc Transporter", *Product Description and Specifications*, Brochure from Eastman Kodak Company, 343 State Street, Rochester NY 14650.

*Primary Examiner*—John Hilten
*Attorney, Agent, or Firm*—Schwegman, Lundberg, Woessner & Kluth P.A.

[57] ABSTRACT

A compact disc transporter is described for transporting a compact disc between multiple process stations. These stations may include a printer, a recorder, a verifier, and a compact disc supply station. Methods have been described for pre-positioning a compact disc prior to printing so that an image located on the compact disc can be positioned for subsequent printing operations. A camera may be used in conjunction with a processor to rotatably position a compact disc into a preferred position prior to a printing operation. An optical sensor is also described for detecting a mark, index mark or other image for positioning a compact disc to a preferred rotational position.

39 Claims, 6 Drawing Sheets

COMPACT DISC PRINTING SYSTEM AND METHOD

This is a continuation-in-part of U.S. application Ser. No. 08/579,927 filed Dec. 28, 1995, now U.S. Pat. No. 5,734,629.

BACKGROUND OF THE INVENTION

Compact discs (CDs) are plastic discs about 12 centimeters (cm) in diameter on which data may be recorded, usually by a stamping process or by a laser process where digital (binary) information is stored by selectively burning extremely small spots about circumferential tracks on the disc. The CD may typically receive its stored information one or more times, and it may be read by appropriate CD readers many times without harming or degrading the stored information. Such CDs are known as CD-R, which indicates that they are recordable CDs. In the context of the present invention, it is to be understood that reference to "CD" includes and preferably encompasses Compact Disc Recordable "CD-R", Compact Disc Erasable "CDE", Digital Versatile Disc "DVD", DVD-R, DVD-RAM, or any disc for data storage. Since a very high density of information may be stored on a CD, it is capable of holding extremely large amounts of data, far exceeding the capabilities of magnetically recorded discs. CDs are typically manufactured in mass production quantities with prerecorded software programs, for commercial sale to users of computers and computer software.

The present invention speeds up and improves the steps involved in the manufacturing process for recording and preparing a CD by significantly reducing the number of manual handling steps required to record, verify and print label information on a CD.

Commercially available compact discs can include some generic pre-printed information on a top surface of the disc. For example, a manufacture of the disc may include an identification mark, logo, or trademark. When the compact disc is subsequently used to store data, it may be desired to present additional personalized information on the compact disc top surface. This additional information may be used to identify the data which is stored on the compact disc, or identify the user who recorded the data onto the compact disc. For example, a manufacture who records data on a recordable compact disc may desired to label the compact disc, provide an image on the compact disc, or print trademarks or indicia on the surface of the compact disc. Because the compact disc can include pre-printed image, the subsequent printing may print on top of the pre-printed image and create an undesirable image. Alternatively, it may be desirable to print on top of the pre-printed image.

For the reasons stated above, and for other reasons stated below which will become apparent to those skilled in the art upon reading and understanding the present specification, there is a need in the art for a method and apparatus for printing an image on a compact disc in a pre-defined location relative to pre-printed material located on the compact disc.

SUMMARY OF THE INVENTION

The above mentioned problems with printing on compact discs and other problems are addressed by the present invention and which will be understood by reading and studying the following specification. A method and apparatus are described which prevent disjointed printing and assures visual harmony of two separate and independent printing processes.

In particular, the present invention describes a method of printing on a compact disc. The method comprises the steps of detecting a image on a surface of the compact disc, rotating the compact disc to align the image with a pre-determined location, and placing the compact disc into a printer for printing on a compact disc.

In an alternate embodiment, a method of recording and aligning an image on a compact disc prior to over-printing is described. The method comprises the steps of recording data on the compact disc using a recording device, determining a rotational position of the compact disc, rotating the compact disc to a pre-determined rotational position, and placing the compact disc into a printer for over-printing.

A method is also described for printing an image on a compact disc. The method comprises the steps of placing the compact disc into either a recording or reading device, recording or reading data on the compact disc, removing the compact disc from the recording or reading device. The method further comprises detecting a image on the compact disc, determining the rotational position of the compact disc based upon the detected image, positioning the compact disc so that the image is at a pre-determined rotational position, placing the compact disc into a printer, and printing the image on the compact disc.

In yet another embodiment, a method of printing on a compact disc is described. The method comprises the steps of identifying a location on a top surface of the compact disc containing a pre-printed image, rotating the compact disc so that the identified location containing the pre-printed image is at a pre-determined rotational position, and printing an additional image on the top surface of the compact disc in a desired location relative to the pre-printed image.

A compact disc printing apparatus is described which comprises a sensor for detecting a first image on a surface of a compact disc, an alignment device for rotationally positioning the compact disc such that the image on the surface of the compact disc is at a pre-determined rotational position, and a printer for printing a subsequent image on the surface of the aligned compact disc in a desired location relative to the first image.

DESCRIPTION OF THE PREFERRED EMBODIMENT

In the following description, a compact disc transporter is described for transporting a compact disc between multiple process stations. These stations may include a printer, a recorder, a reader or verifier, and a compact disc supply station. Methods are described for pre-positioning a compact disc prior to printing so that pre-printed images can be positioned relative to subsequent printed images. It will be appreciated by those skilled in the art, that the transporter illustrated in FIGS. 1–3 is but one possible embodiment.

Figure 1:
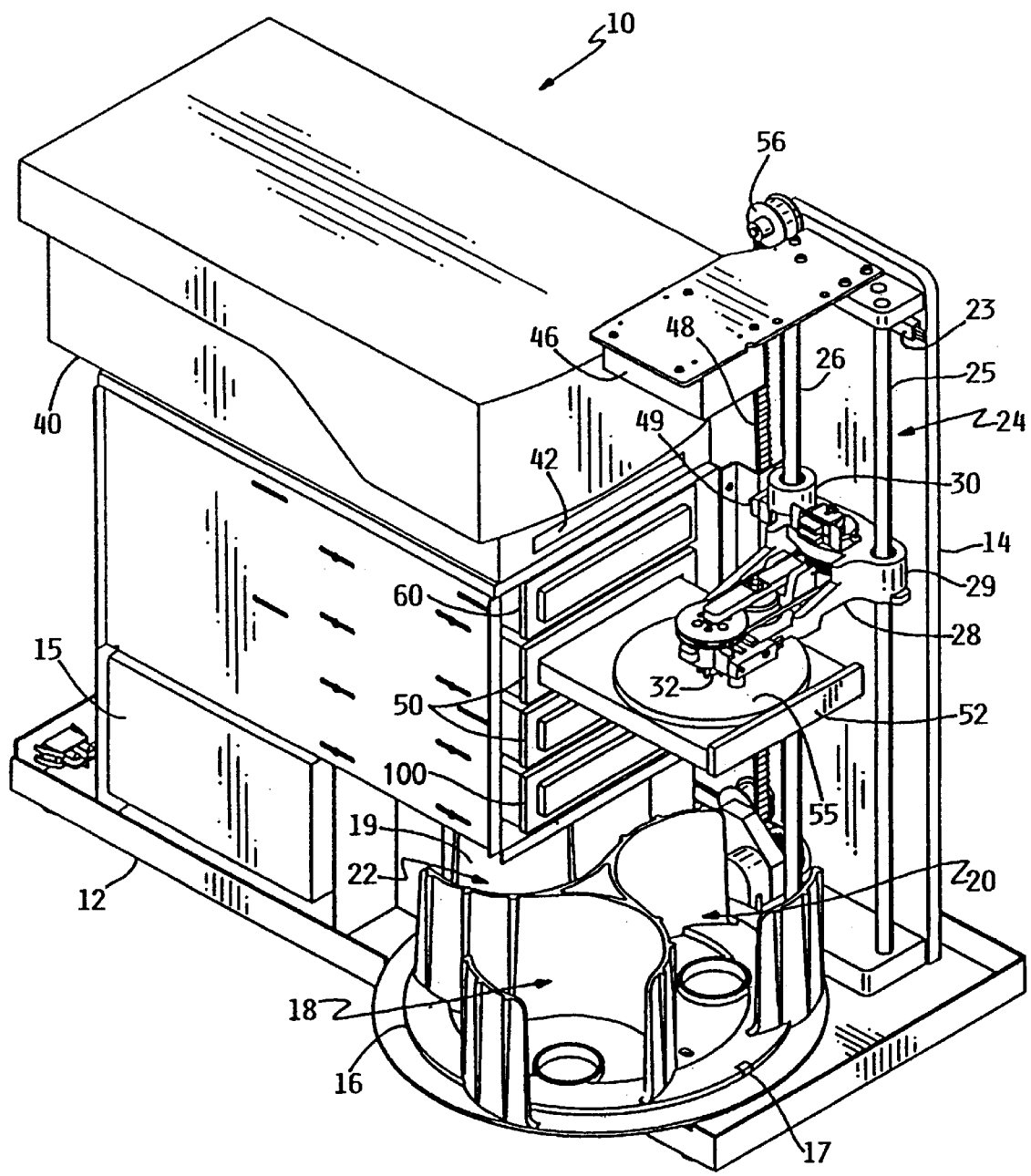
FIG. 1 is a front perspective view of a transporter of the present invention.
Figure 2:
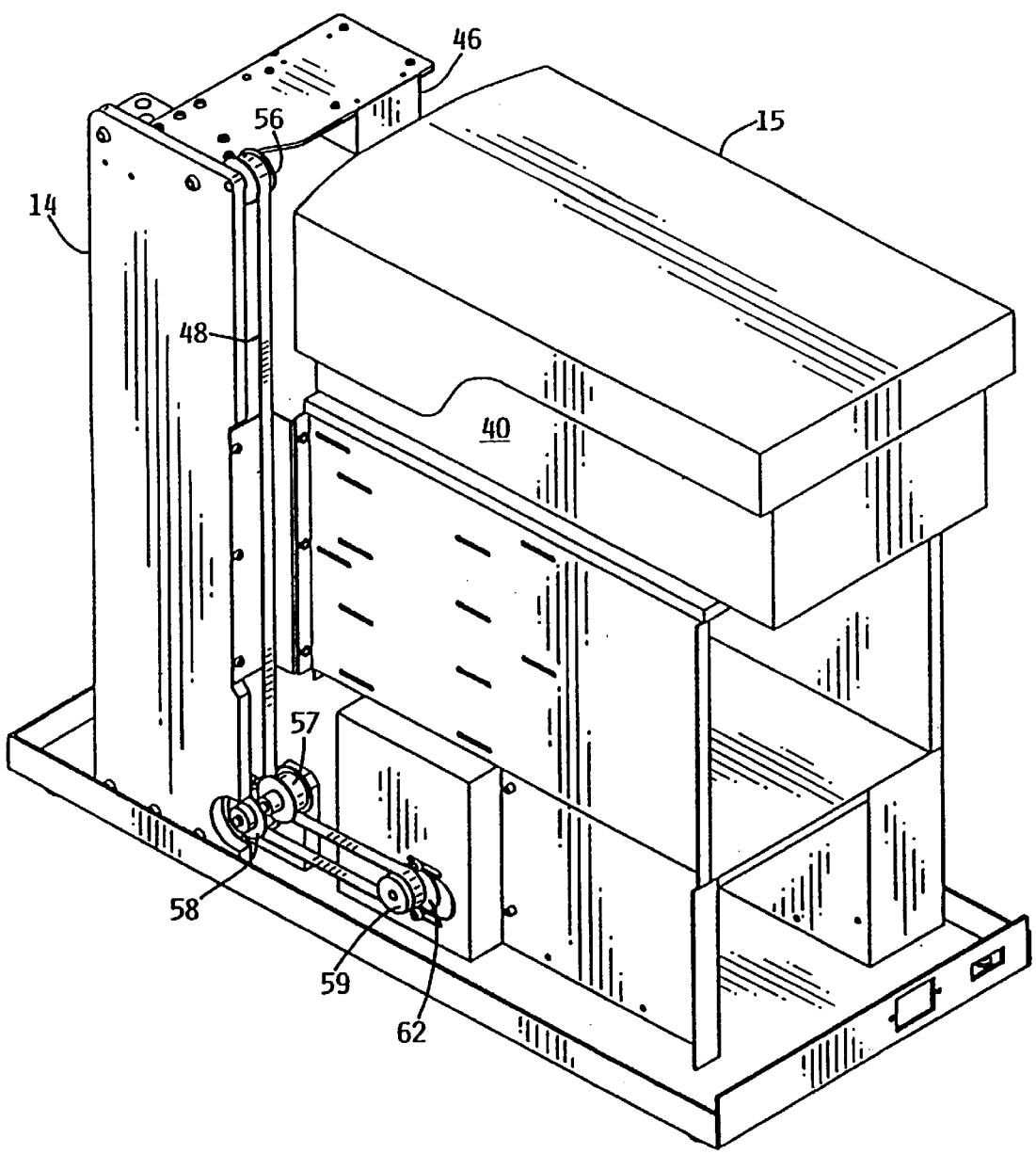
FIG. 2 is a rear perspective view of the transporter of FIG. 1.
Figure 3:
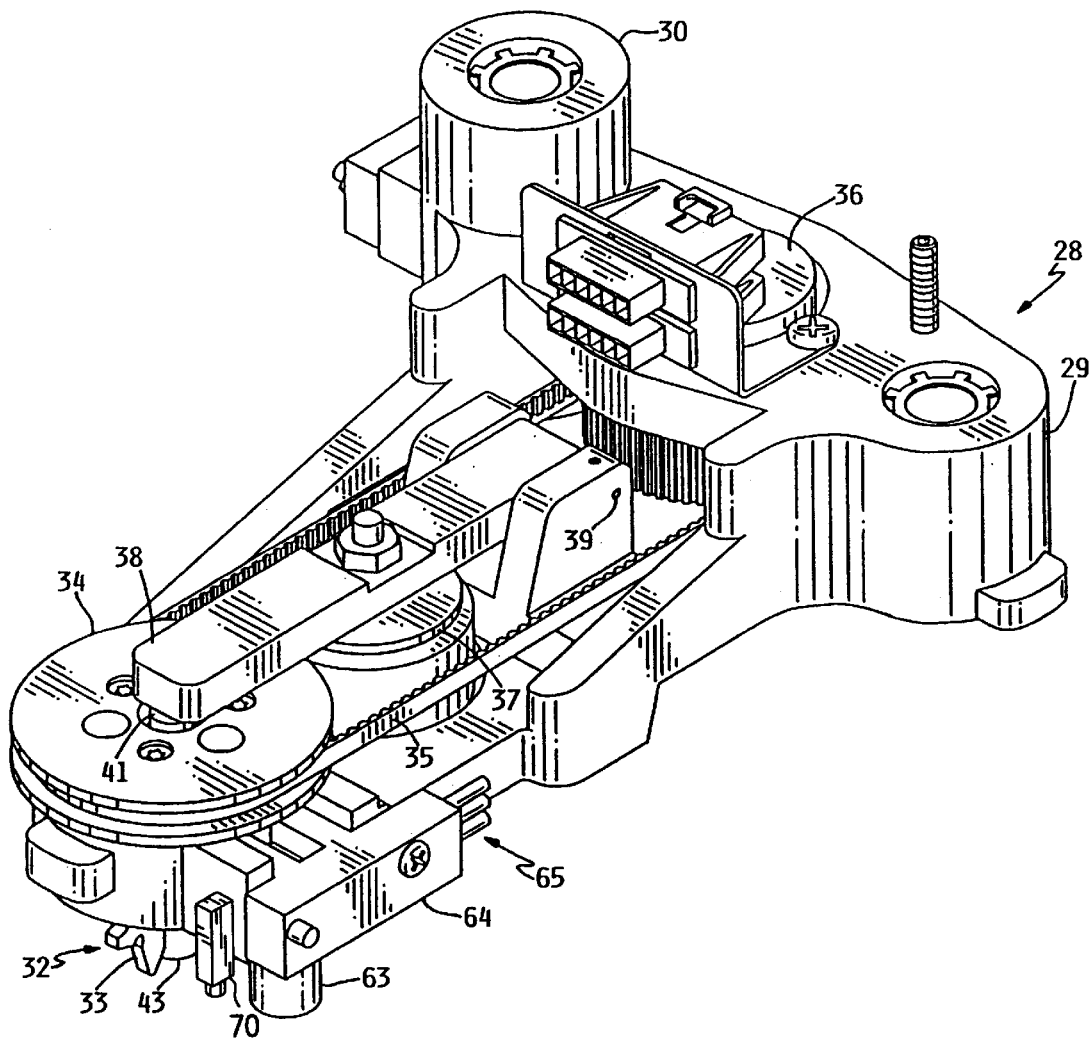
FIG. 3 is an isometric view of a carriage of the transporter of FIG. 1.

Referring to FIGS. 1–3, transporter 10 has a base 12 and a vertical support frame 14. A carousel turntable 16 is rotatably mounted to base 12, and three CD bins 18, 20 and 22 are affixed to turntable 16. One of these bins functions as an input or supply bin, the second bin functions as an output bin, and the third bin functions as a reject collection bin. The carousel turntable 16 is rotatably controllable by a stepper or servo motor 19 which is connected to carousel turntable 16 by an endless loop belt beneath the base 12. The motor 19 is preferably positionable to three stop positions by a computer processor 15, which also controls the other functions to be hereinafter described, in conjunction with position sensors which are selectively placed to monitor positions of the various moving components. For example, carousel 16 has an index mark 17 which may be sensed by an optoelectric sensor (not shown) to detect the "home" position of carousel 16.

A carriage assembly 24 is affixed to base 12 by a pair of guide shafts 25, 26. Carriage assembly 24 has a carriage 28 which is slidably movable over guide shafts 25, 26 via a pair of yokes 29, 30 which have bearing surfaces to facilitate slidable movement. Carriage 28 is vertically movable from a lower position proximate turntable 16 to an upper "home" position aligned with the topmost component of transporter 10. An optoelectric sensor 23 is affixed proximate the upper end of frame 14 to detect when the carriage 28 is in its "home" position.

Carriage 28 has a gripper 32 affixed to its underside, best seen with reference to FIG. 3. Gripper 32 has three expandable and contractible fingers 33 for insertion into the center hole of a CD and expanding to grasp the CD by its center hole for movement. The expansion and contraction of the gripper fingers 33 is controllable by a solenoid 37, and the solenoid 37 is controllable by the aforementioned computer processor 15. Solenoid 37 has an arm 38 which is pivotally movable about a pin 39. The distal end of arm 38 contacts a downwardly directed rod 41 which passes through the center of the gripper fingers 33, and terminates in a conical head 43. Conical head 43 is sized to spread gripper fingers 33 apart when it is raised and to permit gripper fingers 33 to come together when it is lowered. Rod 41 is spring biased in an upward direction so as to cause conical head 43 to spread gripper fingers 33 apart in the normal or deactivated position, thereby providing a gripping force against a CD when the fingers 33 have been inserted into the CD center hole. When solenoid 37 is energized, arm 38 is pulled downwardly and conical head 43 permits gripper fingers 33 to come together, thereby releasing the holding force on a CD. A vertically movable post 63 is located adjacent the gripper fingers 33 and is upwardly movable when the gripper fingers 33 are engaged into a CD, because the upper surface of the CD engages the post 63 and moves it upwardly. An optoelectric sensor 64 is positioned in carriage 28 to detect the upper position of post 63; the sensor 64 generates electrical signals which are coupled to the computer processor 15 via conductors 65 to signal the computer processor when a CD is engaged by the gripper fingers 33.

The rod 41 and gripper 32 are attached to a rotatable pulley 34. Pulley 34 may be rotated by a belt 35 connected to a gripper motor 36. Motor 36 is preferably a stepper motor which is controllable by the aforementioned computer processor 15 to rotatably align a CD which is gripped by gripper 32 for purposes which will be hereinafter described. Sensor 70 is positioned to have a field of view of a top surface of a compact disc which is engaged to the gripper 32. This sensor can be any known type of detection device and can be mounted in any positioned desired to detect a rotational position of the disc, as described in greater detail below. One type of sensor which can be used is an optical sensor detecting light reflected off of the CD surface. Another type of sensor is a camera 46 which obtains an image of the CD, as explained below.

A printer 40 is positioned proximate the upper end of support frame 14, and printer 40 has an opening 42 positioned adjacent the path of travel of carriage 28. A printer drawer may be opened outwardly from opening 40, and may be pulled inwardly into printer 40, all under control of the computer processor 15. The drawer has a circular seat sized to receive a CD which may be deposited therein by selective movement of carriage 28 and gripper 32.

Printer 40 may be operated in conjunction with the rotatable pulley 34 and gripper 32, particularly in cases where certain information has been preprinted onto a CD surface, and the printer is to be used to print certain additional information related to the information stored on the CD. In such cases, it is important that the printer only print information on selected areas of the CD surface and not overprint on areas which have been preprinted. The motor 36 is activated to rotate pulley 34 and a gripped CD to rotatably align the CD for proper insertion into the printer 40. A camera 46 is affixed to the upper end of frame 14, and camera 46 has a downward field of view focused to image the CD surface when the CD is elevated to a proper position on the carriage 28. The video image of the CD surface is transformed into a digital bit map by the processor 15, and this digital bit map may be compared to a pre-stored bit map which is representative of the preferred rotatable position of the CD. If the viewed image does not correspond to the pre-stored bit map image, the motor 36 is activated to rotate the CD until a positive comparison is reached, at which position the CD is ready for insertion into the printer 40. This enables the processor 15 to recognize the preprinted material on the CD and then to rotatably position the CD to place the target print area on the CD in position for printing.

Alternatively, the camera 46 may be used in conjunction with processor 15 to read or verify printed information on the surface of the CD. This operation may be performed after a printing operation has been completed, as a check on the printing operation, or as an independent operation to read printed information on discs which may be loaded into the carousel bins.

One or more recorders 50 may be stacked in vertical arrangement adjacent to vertical frame 14, and each recorder 50 has a recorder drawer 52 which may be extended to receive a CD from gripper 32 on carriage 28. Each recorder 50 is equipped to record data on the CD in any format or arrangement dictated by the computer processor 15. FIG. 1 shows a recorder drawer 52 in an open position with the carriage 28 positioned to load or unload a CD into drawer 52.

A verifier 60 may also be vertically stacked adjacent to frame 14. Verifier 60 has a drawer which operates similar to that of recorder 50 to receive a CD from carriage 28. Verifier 60 functions to read the data stored on a CD, usually after a recorder 50 has completed its recording operation, and to verify the correctness of this data by comparison to the data pre-stored in the computer processor 15.

FIG. 2 shows a rear isometric view of the transporter 10 to illustrate the carriage driving mechanism. A belt 48 is affixed to carriage 28 by a clamp 49 (FIG. 1), and belt 48 is threaded about pulleys 56, 57, 58, and a drive pulley 59. Drive pulley 59 is connected to a motor 62, which is selectively activated by computer processor 15 to cause the drive pulley 59 to rotate to a selected position or to rotate a predetermined number of turns. When motor 62 is activated, either forwardly or rearwardly, belt 48 moves to cause carriage 28 to move upwardly and downwardly. Pulley 58 is preferably connected to a position encoder (not shown) which monitors pulley rotation and, therefore, can detect the vertical position of carriage 28. The position encoder is electrically connected to computer processor 15 to provide carriage position signals to the processor.

In operation, the sequence of movements of the carriage relative to the various other devices may be varied to fit particular circumstances, the following summary being a representative sequence. Since the recording time for certain CD programs may vary from under ten to forty or more minutes, it is usually advisable to utilize several recorders operating at the same time with one verifier checking the recorded data from each CD after the recording operation is complete. For example, if three recorders are used, one recorder could be arranged to be at the start of a recording operation, a second recorder could be in the middle of recording operation, and the third recorder could be finishing a recording operation. In such case, the carriage would be positioned to receive the newly recorded CD from the third recorder and would then deliver the CD to the verifier for checking. Since the verifier operation can be very fast, it could easily be completed before the second recorder finishes its recording operation. The verified CD could then be delivered by the carriage to the printer for label printing and then delivered by the carriage to the carousel output bin. If the printing operation took sufficient time, the carriage could return to the carousel input bin to retrieve the next CD for recording and then deliver this CD to the third recorder (now empty) before returning to the printer to retrieve the CD with the newly printed label. Of course, the carousel position is coordinated with whichever operation is next needed to position an input bin, an output bin, or a reject bin beneath the carriage.

The above described transporter is one possible embodiment of a printing device which can incorporate the compact disc alignment of the present invention. It will be appreciated that the variations are contemplated. For example, the transporter can include bins which move in a linear motion, not rational. Further, the recorders and reader can be included as optional features. Thus, the transporter would primarily operate as a printing device. The gripper described is one means for mechanically grasping a compact disc. Other grasping devices, such as a vacuum device, can be substituted. As such, the present invention is not limited to a specific transporter, and reference is made to the appended claims rather than to the foregoing description to indicate the scope of the invention.

Disc Alignment Prior to Printing

As explained above, a camera 46 can be used to obtain a video image of the CD surface to be transformed into a digital bit map by the processor 15, and compared to a pre-stored bit map which is representative of the preferred rotatable position of the CD.

While this technique can accomplish the desired result of pre-positioning the CD prior to printing, the CD can be pre-positioned using an alternate technique and a different type of sensor.

Figure 4:
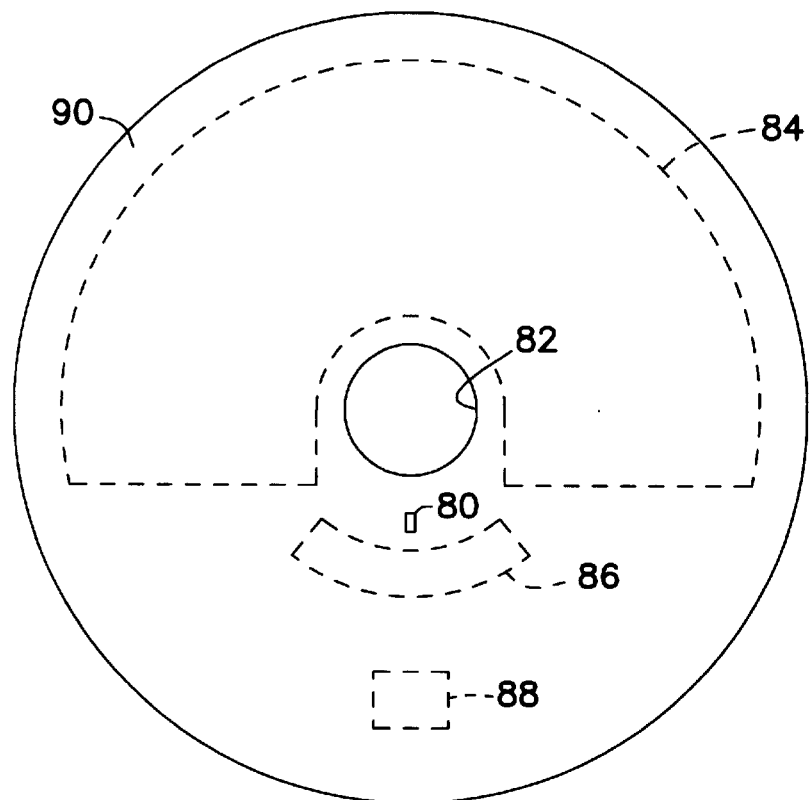
FIG. 4 is an illustration of a top surface of a compact disc.

Referring to FIG. 4, a top surface of a compact disc 90 is illustrated. The compact disc includes an inner opening 82 which is used for gripping and rotating the compact disc during both writing and reading operations on the compact disc. As indicated above, preprinted generic information may be located on commercially available compact discs. This information may be in the form of an image comprising graphics, text, manufacturers identification, logo, trademark, background field, or other types of indicia such as a bar code. For purposes of conciseness, the term "image" is used herein to describe any material provided or printed on a surface of a compact disc and is not limited to textual information, identification, or identifying marks. Further, the term image encompasses both optically and mechanically visible images such as changes in surface reflectivity.

The image may be located on the disc in any location. Two possible printing positions are indicated by reference numbers 86 and 88. It will be appreciated by those skilled in the art, that a subsequent personalized image, or indicia, printed on the top surface of the compact disc may be printed in an area which does not included the preprinted information, such as region 84. That is, if this subsequent printed indicia occupies the same location as the preprinted indicia, the composite image could be visually undesirable, if not unreadable. It may, however, be desirable to print a subsequent image over a prior image. That is, the pre-printed image may include a background field which provides a visual contrast for subsequently printed material. To insure proper positioning relative to pre-printed material, the top surface of the compact disc can also include an index mark 80 provided for identifying a rotational position of the disc and/or the pre-printed image.

Figure 5:
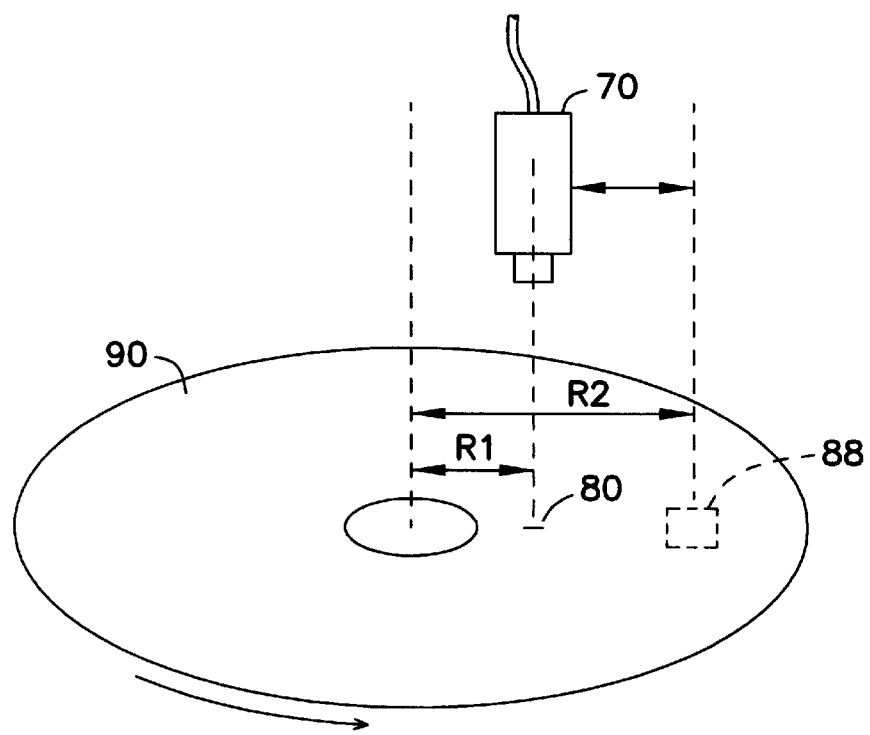
FIG. 5 is a perspective view of a compact disc and sensor.

To insure that preprinted and subsequent over-printed material are positioned relative to each other on the surface of the compact disc, a sensor 70 is used to detect either the preprinted image 88 or an index mark 80, as illustrated in FIG. 5. The preprinted image 88 is illustrated as being located at a general radius R2 from a central axis of the compact disc. Likewise, the index mark is located generally at radius R1.

The sensor 70 is located above the compact disc to provide a field of view which can encompass the region from radius R1 to R2. Because each manufacturer may provide pre-printed images in different locations, it will be appreciated that the sensor field of view may have to encompass the entire surface of the compact disc (ie. R=0 to an outer diameter of disc). Sensor 70 can be a photo-optical sensor capable of detecting an image located on the compact disc, such as printed images or an index mark. Alternately, the sensor can be a camera positioned in a location having a field of view of the compact disc. Other sensing devices known to those skilled in the art are also contemplated.

As stated above, the pre-printed image can included any generic information or image. It is anticipated, however, that the pre-printed image will be located in the same position on all compact discs from one manufacturer. This uniformity allows for detection by a pre-positioned sensor while the compact disc is rotated. Likewise, an index mark can be located in the same position relative to a pre-printed image on supplied compact discs. The index mark can be printed on the surface of the compact disc using any known technique, such as silk screening. In an alternate embodiment, the index mark may be physically formed integrally with the compact disc during manufacturing operations, such as plastic molding, die pressing, or laser etching. By using an index mark, a standardized marking can be used by all CD manufacturers. Thus, any commercially available CD can be used without changing a location of a sensor. The term "image", as used herein, includes printed index marks, index marks which are physically formed integrally with the compact disc (regardless of the method formed), pre-printed images, or any other type of mark which can be detected with a sensor.

Figure 6:
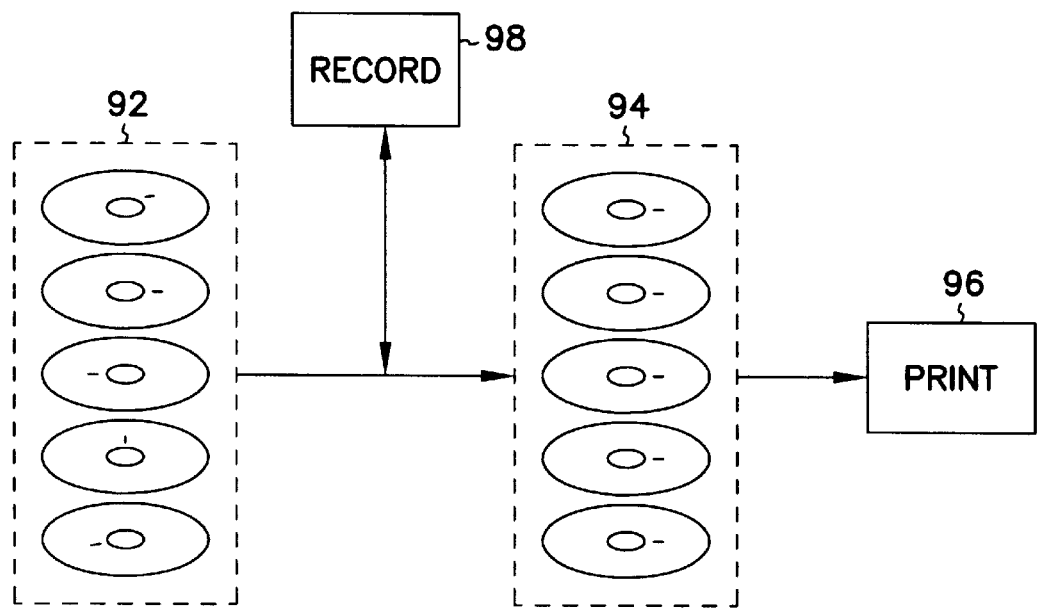
FIG. 6 is an illustration of a method of printing a compact disc according to one embodiment of the present invention.
Figure 7:
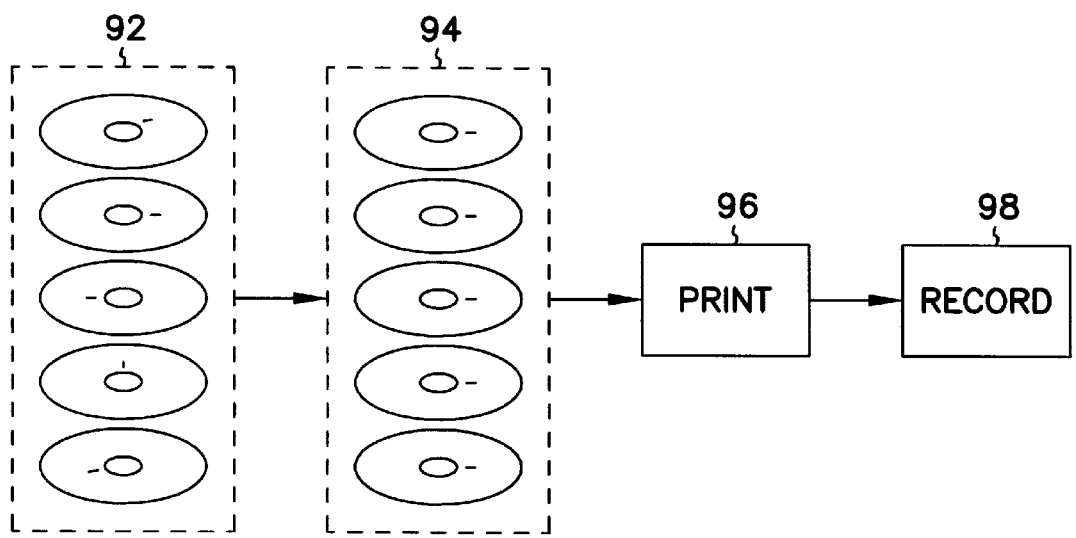
FIG. 7 is an illustration of a method of printing a compact disc according to another embodiment of the present invention.

FIG. 6 illustrates one embodiment of a method of printing an image on a compact disc. A supply of randomly oriented compact discs 92 is provided for processing operations such as printing and recording. The compact discs may be routed to a recorder 50 to have data stored thereon. The compact discs are then aligned 94 such that the index mark or pre-printed image detected by the sensor is in a pre-defined rotational location. That is, the compact discs are rotated until a sensor detects an image so that the compact disc is at a pre-defined rotational position. This is accomplished by monitoring an output of the sensor with a controller, such as processor 15, and controlling a rotating mechanism coupled to the compact disc. In one embodiment, the rotating mechanism is motor 36. Once the rotational position of a compact disc is known, additional controlled rotation can be performed prior to printing. The aligned compact discs are then printed 96 to provide additional personalized images thereon. Data can be read from the compact disc prior to printing to determine what image is to be printed on the surface of the disc. That is, a compact disc can be placed in a reader to determine what is recorded on the disc and then an image is printed based upon the contents of the disc.

The step of aligning the compact discs can be performed while the compact disc is engaged by a gripper 32, in an optional separate orientation station 100 (FIG. 1), or while the compact disc is in printer 40 prior to printing. If a separate orientation station us used, care must be exercised to insure that the oriented discs are not rotated during subsequent transportation prior to printing. It will be understood that the separate orientation station can be remotely located from the transporter, and does not require a mechanical apparatus for rotating the disc for establishing the proper orientation.

In an alternate embodiment, the randomly oriented compact discs 92 are rotational aligned 94 and printed 96 prior to recording data thereon. In this embodiment, the compact discs can be aligned is described above or aligned prior to retrieving from a supply bin 20. That is, the compact discs can be pre-aligned prior to loading into the carousel. It is contemplated that a separate alignment station could be used to insure that the compact discs are properly oriented before loading into the bin.

Figure 8:
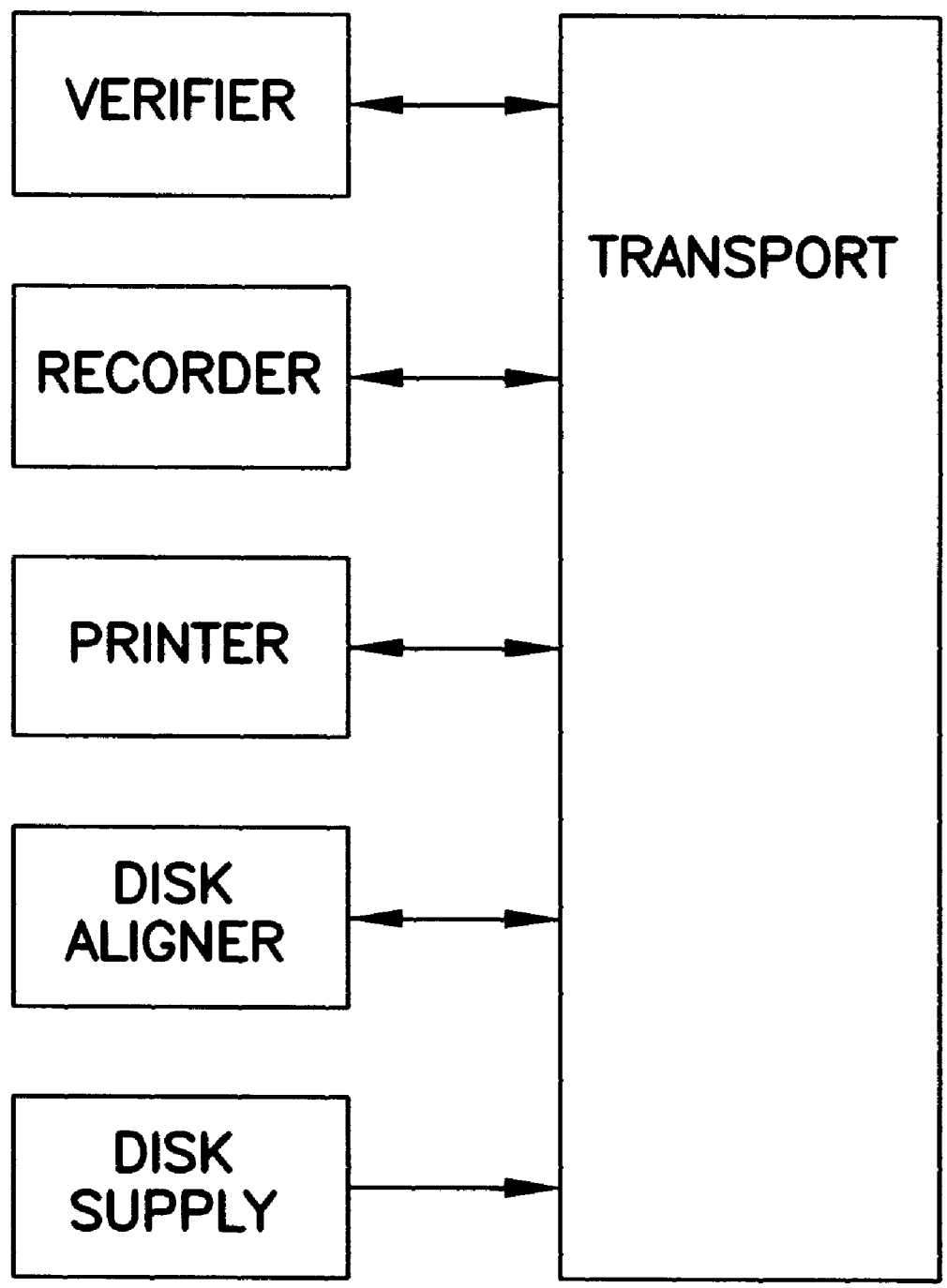
FIG. 8 a block diagram of a transporter of the present invention.

FIG. 8 is a block diagram of a transporter of the present invention. The transporter can include a disc supply location, a disc aligner, a printer, a recorder, a reader or verifier, and a transport for moving a disc. The transporter can be designed to incorporate or eliminate some of these elements. That is, the disc aligner can be incorporated into either the disc supply, transport, or printer. The verifier or recorder can be eliminated. Also, in a print only transporter, the verifier and recorder can be eliminated. It will be appreciated by studying the above specification, that the compact discs are aligned prior to printing and that any other optional operation can be performed before or after the printing operation.

Conclusion

A compact disc transporter has been described for transporting a compact disc between multiple process stations. These stations may include a printer, a recorder, a verifier, and a compact disc supply station. Methods have been described for pre-positioning a compact disc prior to printing so that images on the compact disc can be positioned relative to additional images printed during subsequent printing operations.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. A method of printing on a compact disc, the method comprising:

detecting pre-printed image on a surface of the compact disc;

rotating the compact disc to align the pre-printed image with a pre-determined location; and placing the compact disc into a printer for printing on the compact disc, wherein the printing is performed after the compact disc is in the pre-determined location.

2. The method of claim 1 wherein detecting the pre-printed image comprises:

obtaining a video image of the surface of the compact disc with a camera; and analyzing the image obtained from the camera.

3. The method of claim 1 wherein the compact disc is rotated while the compact disc is engaged by a handling device.

4. The method of claim 1 wherein detecting the pre-printed image on the surface of the compact disc is performed with a sensor.

5. The method of claim 4 wherein the pre-printed image includes an index mark.

6. The method of claims 5 wherein the index mark is located on the surface of the compact disc at a pre-determined radial position.

7. The method of claim 5 wherein the sensor is an optical sensor positioned to detect the pre-printed image or index mark located on the compact disc.

8. The method of claim 1 wherein rotating the compact disc is performed after placing the compact disc into the printer and prior to printing.

9. The method of claim 1 wherein the method is performed using a compact disc transporter comprising:

the printer;

a detector for detecting the pre-printed image; and a gripping device for gripping the compact disc and rotating the compact disc.

10. The method of claim 9 wherein the compact disc transporter further comprises:

a recorder for optically recording data on the compact disc; and a transporter device for transporting the compact disc between the recorder and printer.

11. The method of claim 4 wherein the sensor is an optical sensor that detects light reflected off of a surface of the compact disc.

12. A method of recording and aligning a pre-printed image on a compact disc prior to over-printing, the method comprising:

recording data on the compact disc using a recording device;

determining a rotational position of the compact disc;

rotating the compact disc to a pre-determined rotational position; and placing the compact disc into a printer for over-printing such that the over-printing is performed after the compact disc is in the pre-determined rotational position.

13. The method of claim 12 further comprising verifying that data recorded on the compact disc using the recording device.

14. The method of claim 12 wherein determining a rotational position of the compact disc comprises:

obtaining a video image of a surface of the compact disc with a camera;

analyzing the image obtained from the camera; and detecting a location of a pre-printed image on the surface of the compact disc.

15. The method of claim 12 wherein the compact disc is rotated while the compact disc is engaged by a handling device.

16. The method of claim 12 wherein determining a rotational position of the compact disc comprises detecting a pre-printed image on a surface of the compact disc with a sensor.

17. The method of claim 16 wherein the pre-printed image includes an index mark.

18. The method of claims 17 wherein the index mark is located on the surface of the compact disc at a pre-determined radial position.

19. The method of claim 16 wherein the sensor is an optical sensor positioned to detect the pre-printed image or index mark located on the compact disc.

20. The method of claim 12 wherein rotating the compact disc is performed after placing the compact disc into the printer and prior to over-printing.

21. The method of claim 12 wherein over-printing is performed on the pre-printed image.

22. The method of claim 12 wherein the rotational position of the compact disc is determined by detecting an index mark on the compact disc.

23. The method of claim 16 wherein the sensor is an optical sensor that detects light reflected off of a surface of the compact disc.

24. A method of recording and printing indicia on a pre-printed compact disc, the method comprising:

placing the compact disc into a recording device;

recording data on the compact disc;

removing the compact disc from the recording device;

detecting a pre-printed image on the compact disc;

determining the rotational position of the pre-printed image on the compact disc;

positioning the compact disc so that the pre-printed image is at a pre-determined rotational position;

placing the compact disc into a printer; and printing the indicia on the compact disc after the compact disc is in the pre-determined rotational location.

25. The method of claim 24 wherein positioning the compact disc is performed while the compact disc is located in the printer prior to printing.

26. The method of claim 24 wherein positioning the compact disc comprises:

moving the compact disc to an aligning station;

placing the compact disc in the aligning station; and positioning the compact disc to the pre-determine rotational position.

27. The method of claim 24 further comprising:

stacking a plurality of compact discs in a supply bin; and selectively removing one of the plurality of compact discs from the supply bin prior to placing the compact disc into the recording device.

28. The method of claim 24 further comprising:

removing the compact disc from the printer; and transporting the compact disc to a receiving location.

29. The method of claim 24 wherein the indicia is printed on the pre-printed image.

30. The method of claim 24 wherein the pre-printed image is an index mark.

31. The method of claim 24 wherein an optical sensor is used to detect light reflected off of a surface of the compact disc to detect the pre-printed image on the compact disc.

32. A method of printing on a compact disc, the method comprising:

identifying a location on a surface of the compact disc containing pre-printed indicia;

rotating the compact disc so that the identified location containing the pre-printed indicia is at a pre-determined rotational position; and printing additional indicia on the surface of the compact disc in a location not containing the pre-printed indicia wherein printing the additional indicia is performed after the pre-printed indicia is at the pre-determined rotational position.

33. The method of claim 32 wherein the location containing the pre-printed indicia is identified using a sensor having a field of view of the surface.

34. The method of claim 32 wherein the location containing the pre-printed indicia is identified using an optical sensor that detects light reflected off of a surface of the compact disc.

35. A method of printing on a compact disc, the method comprising:

detecting a rotational position of the compact disc using a pre-printed image mark located on a surface of the compact disc;

placing the compact disc into a printer for printing on the compact disc; and printing an image on the compact disc in a predetermined location on the surface of the compact disc in response to the detected rotational position of the compact disc.

36. The method of claim 35 wherein detecting the pre-printed image comprises:

obtaining a video image of the surface of the compact disc with a camera; and analyzing the image obtained from the camera.

37. The method of claim 35 wherein detecting the pre-printed image or mark on the surface of the compact disc is performed with a sensor.

38. The method of claim 37 wherein the pre-printed image or mark includes an index mark.

39. The method of claim 37 wherein the sensor is an optical sensor that detects light reflected off of a surface of the compact disc.

* * * * *